United States Patent
Long et al.

(10) Patent No.: US 12,375,460 B2
(45) Date of Patent: Jul. 29, 2025

(54) SECURE INSTANCE METADATA AS CRYPTOGRAPHIC IDENTITY

(71) Applicant: Oracle International Corporation, Redwood Shores, CA (US)

(72) Inventors: Anthony Long, Edmonds, WA (US); Brady Turner, Crestview Hills, KY (US); Mina Anes, Bothell, WA (US); Mauruthi Geetha Mohan, Seattle, WA (US); Adam Franklin Wilford, Lexington, KY (US); Bill Chau, Sammamish, WA (US); Timothy Kraus, Lexington, KY (US); David Dale Becker, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 18/131,479

(22) Filed: Apr. 6, 2023

(65) Prior Publication Data
US 2024/0340272 A1    Oct. 10, 2024

(51) Int. Cl.
*H04L 9/40* (2022.01)

(52) U.S. Cl.
CPC ...... *H04L 63/0442* (2013.01); *H04L 63/0823* (2013.01)

(58) Field of Classification Search
CPC .................. H04L 63/0442; H04L 63/0823
See application file for complete search history.

*Primary Examiner* — Brian Whipple
(74) *Attorney, Agent, or Firm* — Kilpatrick Townsend & Stockton LLP

(57) ABSTRACT

A method may include transmitting a request for metadata associated with a compute instance and receiving, by a computing system, metadata associated with the compute instance signed with a private key. The private key may be associated with a public key. The method may include receiving a request to access a cloud resource and transmitting the request for the metadata. The method may also include receiving the metadata. The metadata may indicate that the compute instance is hosted on the computing system. The method may also include transmitting, to an instance principal service, a request for an instance principal certificate. The request may include the metadata signed with the private key and be cryptographically verified by the instance principal service using the public key. The method may also include receiving the instance principal certificate and providing access to the could resource based on the instance principal certificate.

20 Claims, 8 Drawing Sheets

SECURE INSTANCE METADATA AS CRYPTOGRAPHIC IDENTITY

BACKGROUND

Cloud services providers may provide compute instances to many cloud services users simultaneously. Each of these cloud services users may request access one or more cloud resources. In order to provide access to the one or more cloud resources, the cloud services users may need to be authenticated before being granted access.

BRIEF SUMMARY

A method may include transmitting, by a computing system, a request for metadata associated with a compute instance to be hosted on the computing system. The method may also include receiving, by a metadata service hosted by the computing system, metadata associated with the compute instance and signed with a private key. The private key may be associated with a public key. The method may also include receiving, by the computing system via the compute instance, a request to access a cloud resource. The method may also include transmitting, by an instance principal agent hosted on the computing system and to the metadata service, a request for the metadata associated with the compute instance. The method may also include receiving, by the instance principal agent hosted on the computing system, the metadata signed with the private key. The metadata may indicate that the compute instance is hosted on the computing system. The method may also include transmitting, by the instance principal agent and to an instance principal service, a request for an instance principal certificate. The request may include the metadata signed with the private key and be cryptographically verified by the instance principal service using the public key. The method may also include receiving, by the computing system, the instance principal certificate. The method may include providing, by the computing system, access to the could resource based at least in part on the instance principal certificate.

In some embodiments, the public key may include an asymmetrical key pair. The asymmetrical key pair may be generated by a key management service hosted by a cloud provider. The asymmetrical key pair may be generated on a tenant-by-tenant basis and updated on a regular interval.

In some embodiments, the metadata may include at least one of an account identifier, a tenant identifier, or an internet protocol (ip) address associated with the computing device. The signed metadata may be refreshed prior to a scheduled expiration.

In some embodiments, the instance principal service may verify a particular ip address used to transmit the request for the cloud service against the ip address associated with the computing device. The computing device may include a smart network interface card.

A system may include one or more processors. The system may also include one or more computer-readable media may include instructions that, when executed by the one or more processors, cause the system to perform operations to: transmit by a computing system, a request for metadata associated with a compute instance to be hosted on the computing system. The system may receive, by a metadata service hosted by the computing system, metadata associated with the compute instance and signed with a private key. The private key may be associated with a public key. The system may then perform operations to receive, by the computing system via the compute instance, a request to access a cloud resource. The system may then transmit, by an instance principal agent hosted on the computing system and to the metadata service, a request for the metadata associated with the compute instance. The system may then receive, by the instance principal agent hosted on the computing system, the metadata signed with the private key. The metadata may indicate that the compute instance is hosted on the computing system. The system may then transmit, by the instance principal agent and to an instance principal service, a request for an instance principal certificate. The request may include the metadata signed with the private key and be cryptographically verified by the instance principal service using the public key. The system may then perform an operation to receive, by the computing system, the instance principal certificate. The system may then include provide access to the could resource based at least in part on the instance principal certificate.

In some embodiments, the public key may include an asymmetrical key pair. The asymmetrical key pair may be generated by a key management service hosted by a cloud provider. The asymmetrical key pair may be generated on a tenant-by-tenant basis and updated on a regular interval.

In some embodiments, the metadata may include at least one of an account identifier, a tenant identifier, or an internet protocol (ip) address associated with the computing device. The signed metadata may be refreshed prior to a scheduled expiration.

A non-transitory computer-readable storage medium may store a set of instructions. The instructions, when executed by one or more processors of a computer system, may cause the computer system to perform operations. The operations may include transmitting, by a computing system, a request for metadata associated with a compute instance to be hosted on the computing system. The operations may also include receiving, by a metadata service hosted by the computing system, metadata associated with the compute instance and signed with a private key. The private key may be associated with a public key. The operations may also include receiving, by the computing system via the compute instance, a request to access a cloud resource. The operations may also include transmitting, by an instance principal agent hosted on the computing system and to the metadata service, a request for the metadata associated with the compute instance. The operations may include receiving, by the instance principal agent hosted on the computing system, the metadata signed with the private key. The metadata may indicate that the compute instance is hosted on the computing system. The operations may also include transmitting, by the instance principal agent and to an instance principal service, a request for an instance principal certificate. The request may include the metadata signed with the private key and be cryptographically verified by the instance principal service using the public key. The operations may also include receiving, by the computing system, the instance principal certificate. The operations may include providing, by the computing system, access to the could resource based at least in part on the instance principal certificate.

In some embodiments, the public key may include an asymmetrical key pair. The asymmetrical key pair may be generated by a key management service hosted by a cloud provider. The asymmetrical key pair may be generated on a tenant-by-tenant basis and updated on a regular interval.

In some embodiments, the metadata may include at least one of an account identifier, a tenant identifier, or an internet protocol (ip) address associated with the computing device. The signed metadata may be refreshed prior to a scheduled expiration.

DETAILED DESCRIPTION

Figure 1:
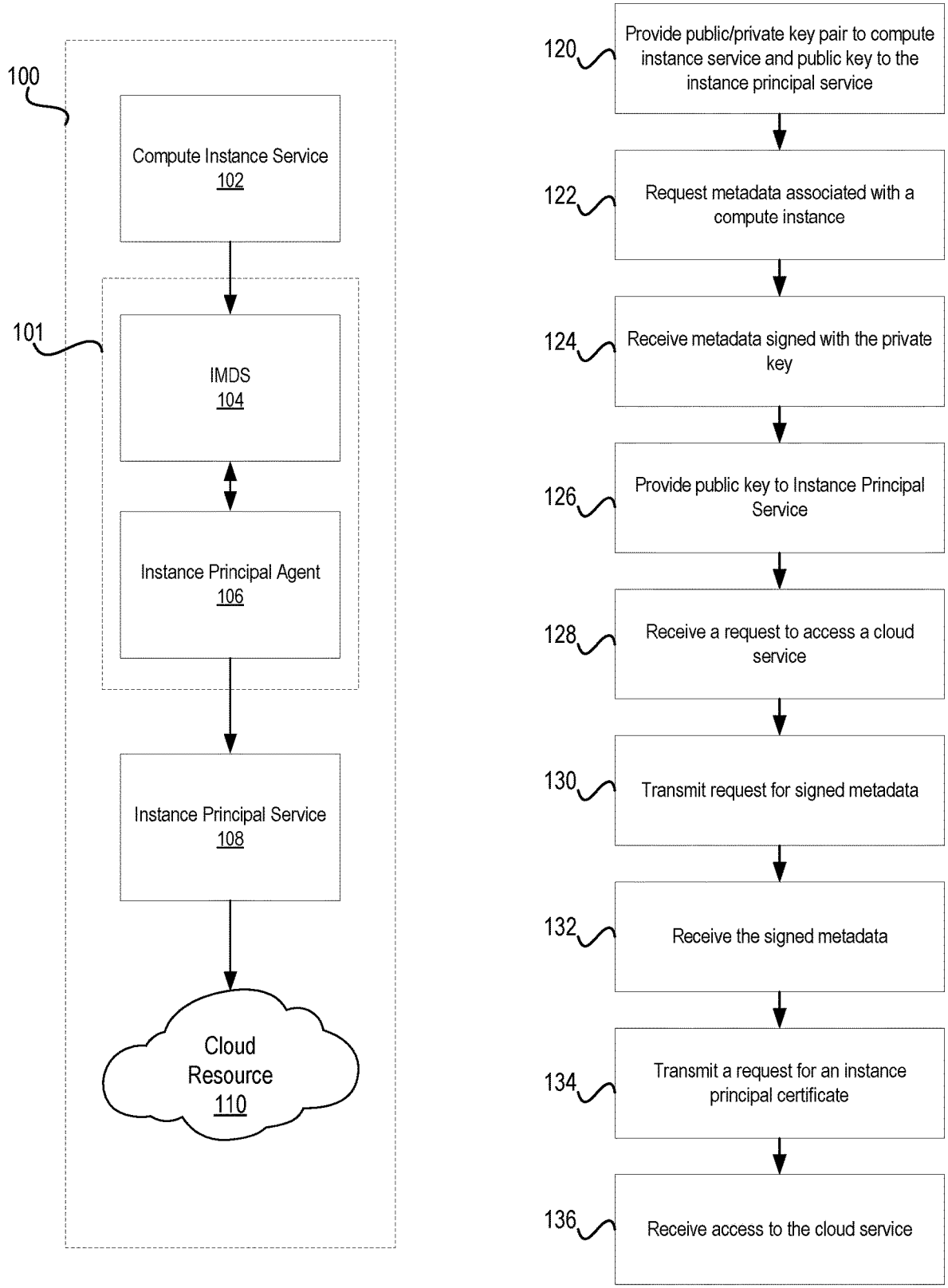
FIG. 1 illustrates a simplified diagram of a cloud services provider and process for verifying the identity of a compute instance, according to certain embodiment.

A cloud services provider may provide an instance of a virtual machine (e.g., a compute instance) to a cloud user. The compute instance may be hosted on a computing device of the cloud services provider. The computing device may be a singular device or may be multiple computing devices (sometimes, a "computing system"). The compute instance may be considered to have a tenancy on the computing device. The computing device may host multiple compute instances in multiple tenancies for many cloud services users concurrently. At the same time, the cloud services provider may have many such computing devices. Thus, there may be any number of compute instances associated with any number of cloud services users at a given time. A compute instance service, hosted by the cloud services provider, may perform services associated with each of the compute instances, the cloud services users, and/or the cloud services provider. The services may include the creation and management of compute instances, identity verification, and other such services.

The cloud services provider may also provide access to various cloud resources to the cloud services users via associated compute instances. The various cloud service may not be accessible by all cloud services users. A cloud services user may need specific permissions in order to access a cloud resources. In order to verify the specific permission needed to access the cloud resource, the cloud services provider may need to verify an identity of a cloud services user. An intermediary service may authenticate the compute instance for any relevant cloud resources instead of authenticating the compute instance and/or the cloud services user for each cloud resource individually. The intermediary service may include two components: an instance principal agent (hosted on the computing device) and an instance principal service. The instance principal agent may manage credentials for all compute instances hosted on the computing device and the instance principal service may to authenticate compute instances in order for the compute instances to access the cloud resources.

In order to verify the credentials of a compute instance and/or the cloud services user, the instance principal agent may make a call to the instance principal service to obtain a device certificate. The device certificate may verify that a computing device hosting the compute instance and the instance principal agent is assigned to an IP address associated with the requested device certificate. The instance principal agent may then request a list of all compute instances hosted on the computing device to the instance principal service. The instance principal service may then make a call to the compute instance agent and receive the list of all compute instances hosted on the computing device.

Upon receiving a request to access a cloud resource from a requesting compute instance, the instance principal agent may call to the instance principal service to issue and/or verify an instance principal certificate associated with the requesting compute instance. The instance principal certificate may be used to authenticate the compute instance to the cloud resource. The instance principal service may make another call via an API to the compute instance service to verify the tenancy of the compute instance. The compute instance may then be authenticated to the cloud resource using the instance principal certificate.

In the above system, the compute instance service may be the sole source of truth to verify the identity of a compute instance. Given the amount of compute instances and/or cloud computing users that may be hosted by the cloud services provider, verifying an identity of a compute instance each time access to a cloud resource is requested may lead to large amounts of network traffic. The large amounts of network traffic may cause temporary outages and/or slow service for the cloud computing users as well as drain resources of the cloud services provider. Furthermore, because the compute instance service may be the only source of truth with which to verify identities of the compute instances/cloud computing users, such a system may be vulnerable to prolonged outages. For example, if the compute instance agent experiences unexpected downtime, no cloud services users or compute instances may be verified until the compute instance agent is returned to service.

One solution to address these issues may be to reduce the compute instances responsibility of verifying an identity of the compute instance and/or the cloud services user for each request by a compute instance. In other words, a solution may be to decentralize the source of truth. Using a public/private key pair, the compute instance service may digitally sign metadata and/or a token (together, sometimes the "signed metadata") associated with a compute instance. The compute instance service may then provide the public key to the instance principal service.

The signed metadata may be stored by the computing device hosting the compute instance. The signed metadata may persist on the computing device for some period of time (for example, 2 hours). When the compute instance requests access to a cloud resource the instance principal agent may request the signed metadata from a metadata service hosted on the computing device. The instance principal agent may then request that an instance principal certificate be issued and provided by the instance principal service. The instance principal agent may include the token in the request to sign the instance principal certificate. The instance principal service may then cryptographically verify the identity of the compute instance using the public key provided by the compute instance service. The instance principal service may also verify that an IP address included in the signed metadata matches the IP address from which the request is received. Then, the instance principal service may provide the instance principal certificate and the compute instance may access the cloud resource.

The techniques described herein may enable many fewer calls to the compute instance service. Instead, an initial call may be made upon the creation of the compute instance. Verifications may then be performed using a token stored on the computing device rather than making calls to the compute instance service each time a cloud resource is requested. Therefore, overall traffic may be reduced, and a more robust method of compute instance verification achieved.

FIG. 1 illustrates a simplified diagram of a cloud services provider 100 and process for verifying the identity of a compute instance, according to certain embodiment. The cloud services provider 100 may provide various cloud-based services to cloud services users. The could-based services may include providing compute instances to the cloud services users. A plurality of compute instances may be hosted on a computing device 101. The computing device 101 may be a smart network interface card (Smart NIC), server, or other suitable computing device. The cloud services provider 100 may include a compute instance service 102. The compute instance service 102 may manage one or more services for compute instances. The one or more services may include the generation of metadata associated with the compute instance, identity verification of the compute instance and/or the cloud computing user associated with the compute instance, and other such services.

The computing device 101 may include one or more services including an Instance Metadata Service (IMDS) 104 and an instance principal agent 106. The IMDS 104 may store metadata associated with each of the plurality of compute instances. The metadata may include a region, a subnet, identity credentials, a tenant identifier, an account identifier, and other such information. The metadata may be provided to the IMDS 104 via the computing device 101 from the compute instance service 102 upon the creation of a compute instance.

The instance principal agent 106 may manage instance principal certificates for each of the compute instances hosted on the computing device 101. The instance principal certificates may be used to authenticate the associated compute instance in order to provide access to a cloud resource. The instance principal agent 106 may communicate with the instance principal service 108, also hosted by the cloud services provider 100. The instance principal service 108 may verify information associated with the compute instance and/or the computing device 101. The information may include an IP address associated with the computing device 101. The information may also include a digital signature associated with the compute instance to provide access to the cloud resource 110. The cloud resource may 110 may be hosted by the cloud services provider 100 or be hosted by a third-party.

The process depicted in FIG. 1 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 1 and described below is intended to be illustrative and non-limiting. Although FIG. 1 depicts the various processing steps occurring in a particular sequence or order, this is not intended to be limiting. In certain alternative embodiments, the steps may be performed in some different order, some steps may be performed in parallel, or some steps may be completely omitted. In certain embodiments, such as in the embodiment depicted in FIG. 1, the processing may be performed by some of all of the components shown in the cloud services provider 100.

At step 120, the compute instance service 102 may access a public/private key pair. The compute instance service 102 may store the public/private key pair until used or may not access the public/private key pair until a compute instance is instantiated. The public/private key pair may be an asymmetrical key pair, used to cryptographically sign digital signatures via asymmetric cryptography methods. The public/private key pair may be generated by a key management service. The key management service may be hosted by the cloud services provider 100 or may be a third-party service. In some embodiments, the public/private key pair may be generated on a tenant-by-tenant basis, where the public/private key pair is associated with a specific tenancy on the computing device 201.

At step 122, the IMDS 104 hosted on the computing device 101 may request metadata associated with a compute instance from the compute instance service 102. The IMDS 104 may request the metadata in response to an instantiation of the compute instance. The compute instance may have been requested by a cloud services user and thus be associated with the cloud services user. The compute instance may be used by the cloud services user to access one or more cloud resources such as the cloud resource 110.

The compute instance service 102 may identify metadata associated with the compute instance. The metadata may include information such as an identification of the compute instance, an account identifier associated with the cloud services user, a tenant identifier, an IP address associated with the computing device 101 that is hosting the compute instance, and other such information. The compute instance service 102 may digitally sign at least a portion of the metadata associated with the compute instance using the private key of the public/private key pair. In some embodiments, the compute instance service 102 may inject a token into the metadata, where the token includes the digital signature. The digital signature and/or the token may have a scheduled expiry (e.g., 1 week). In some embodiments, the scheduled expiry may be open-ended, such that the digital signature never expires.

At step 124, the IMDS 104 may receive the metadata associated with the compute instance from the compute instance service 102. The metadata may be signed with the digital signature and/or include a token with the digital signature. The IMDS 104 may cache the metadata and/or the token on a memory device included on the computing device 101. In some embodiments, the compute instance service 102 may push updated metadata to the IMDS 104 before the scheduled expiry. The updated metadata may include a new digital signature, signed with a new private key of a new public/private key pair. In some embodiments, the updated may include a token with the new digital signature.

At step 126, the compute instance service 102 may provide the public key of the public/private key pair to the instance principal service 108. The instance principal service 108 may store the public key until the scheduled expiry and/or until the compute instance service 102 provides the new public key of the new public key pair.

At step 128, the computing device 101 may receive a request to access the cloud resource 110 from the compute instance. The cloud resource 110 may include object storage, a cloud-based application, or other such cloud service. The request may be received by or forwarded to the instance principal agent 106. The instance principal agent 106 may determine that no instance principal certificate associated with the compute instance making the request is stored on the computing device 101. Then, at step 130, the instance principal agent 106 may transmit a request for at least a portion of signed metadata associated with the compute instance to the IMDS 104. The requested portion may include the digital signature and/or the token, the IP address associated with the computing device 101, and other such information. The IMDS 104 may manage signed metadata for multiple compute instances hosted on the computing device 101. At step 132, the instance principal agent 106 may receive the requested portion of the signed metadata from the IMDS 104.

At step 134, the instance principal agent 106 may transmit a request for an instance principal certificate to the instance principal service 108. The request for the instance principal certificate may include the portion of the signed metadata. The request may also be transmitted using the IP address associated with the computing device 101. The instance principal service 108 may then cryptographically verify the digital signature included in portion of the signed metadata using the public key of the public/private key pair. The instance principal service 108 may then authenticate that the request for the instance principal certificate is associated with the compute instance, at least in part, because the compute instance service 102 signed the metadata with the digital signature.

The instance principal service 108 may also determine that the requesting compute instance is hosted on the computing device 101. To do so, the instance principal service 108 may compare the IP address included in the signed metadata and/or token and the IP address used to transmit the request. If the IP address included in the signed metadata matches the IP address used to transmit the request, the instance principal service 108 may determine that the compute instance is hosted on the computing device 101.

Upon cryptographically verifying the digital signature and the IP address in the signed metadata, the instance principal service 108 may then issue the instance principal certificate to the instance principal agent 106. The instance principal certificate may have an associated expiry, characterized by being shorter than the scheduled expiry of the digital signature and/or token (e.g., 2 hours). In other words, the instance principal certificate may refresh before the digital signature expires. The instance principal agent 106 may store the instance principal certificate until the associated expiry is reached. Thus, the instance principal certificate may be refreshed without a call being made to the compute instance service 102 every time. At step 136, the computing device 101 may receive access to the cloud resource 110, at least in part, based on the instance principal certificate. The computing device 101 may provide access to the cloud resource 110 to the compute instance.

Figure 2:
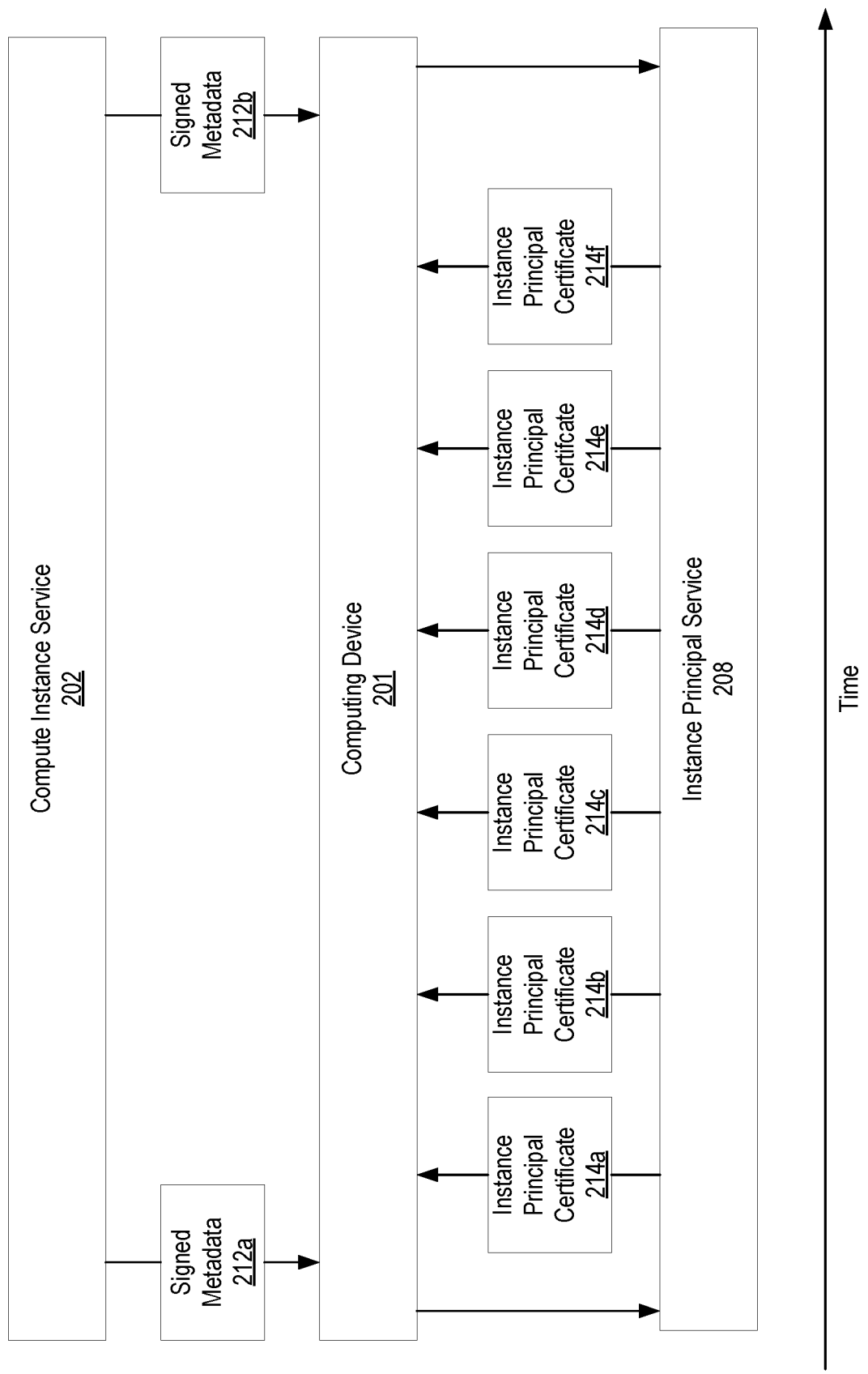
FIG. 2 illustrates a simplified diagram of refresh periods for signed metadata and instance principal certificates, according to certain embodiments.

FIG. 2 illustrates a simplified diagram of refresh periods for signed metadata 212a-b and instance principal certificates 214a-b, according to certain embodiments. The signed metadata 212a-b may be provided to a computing device 201 by a compute instance service 202. The instance principal certificates 214a-b may be provided to the computing device 201 by an instance principal service 208.

The computing device 201, the compute instance service 202, and the instance principal service 208 may all be hosted by a cloud services provider, such as the cloud services provider 100 in FIG. 1. The computing device 201 may be similar to the computing device 101 in FIG. 1. Therefore, there may by an IMDS such as the IMDS 104 and an instance principal agent such as the instance principal agent 106. The computing device 201 may also host one or more compute instances. The compute instances may be associated with one or more cloud services users.

The compute instance service 202 may manage one or more services for compute instances. The one or more services may include the generation of metadata associated with the compute instance, identity verification of the compute instance and/or the cloud computing user associated with the compute instance, and other such services. The compute instance service 202 may cryptographically sign metadata associated with a compute instance hosted on the computing device. The compute instance service 202 may use a public/private key pair to digitally sign the metadata and/or generate a token with the digital signature and include the token in the signed metadata 212a. The compute instance service 202 may provide the public key of the public/private key pair to the instance principal service 208.

The signed metadata 212a may be provided to the IMDS of the computing device 101 upon the instantiation of the compute instance. The signed metadata 212a may have an associated expiry (e.g., 1 week). In some embodiments, the associated expiry may be infinite, and the signed metadata 212a may persist until there is some change to a state of the compute instance. The IMDS may cause the signed metadata 212a to be stored in a memory device of the computing device 101 for the time between receiving the signed metadata 212a and the expiration of the signed metadata 212a.

In one example, the compute instance may run continuously on the computing device 101. The signed metadata 212a may be provided upon the instantiation of the compute instance in response to a request from the IMDS. At the end of the associated expiry, the compute instance service 202 may digitally sign metadata associated with the compute instance (and/or generate a token with the digital signature) and push the signed metadata 212b to the computing device 201.

The instance principal agent of the computing device 201 may receive a request from the compute instance for an instance principal certificate in order to access a cloud resource. The instance principal agent may then request the signed metadata 212a from the IMDS (also hosted on the computing device 201) and submit a request for the instance principal certificate to the instance principal service 208. The request for the instance principal certificate may include all or some of the signed metadata 212a. The instance principal service 208 may cryptographically verify the digital signature included in the request and an IP address on which the request was received. The instance principal service 208 may or may not store information associated with the verified digital signature.

The instance principal service 208 may then provide the instance principal certificate 214a. The instance principal certificate 214a may be used to provide the computing device and/or the compute instance access to the cloud resource. The instance principal certificate 214a may include account information associated with the compute instance and/or the cloud services user, credentials for the cloud resource, and other such information.

The instance principal certificate 214a may have a scheduled expiry, shorter than that of the signed metadata 212a (e.g., 2 hours). The computing device 201, via the instance principal agent, may store the instance principal certificate 214a in the memory device up until the scheduled expiry. Upon reaching scheduled expiry of the instance principal certificate 214a, the computing device 101 (via the instance principal agent) may send a second request for an instance principal certificate to the instance principal service 208. After cryptographically verifying the digital signature included in the request and the IP address, the instance principal service 208 may provide the computing device 201 with the instance principal certificate 214b. A similar process may be used to provide the computing device 201 with the instance principal certificates c-f.

In some embodiments, the instance principal certificates 214a-f may be refreshed on a regular schedule, such as at or before the expiry of the preceding instance principal certificate 214a-f. The refresh may be caused by the computing device 201 (via the instance principal agent) requesting a new instance principal certificate from the instance principal service 208. Alternatively or additionally, the new instance principal certificate 214a-f may be pushed to the computing device 201 from the instance principal service 208.

As is shown in FIG. 2, the associated expiry of the signed metadata 212a-b may be shorter than the scheduled expiry of the instance principal certificates 214a-f. The relatively long life of the signed metadata 212a-b may reduce traffic to the compute instance service 202. In other systems, the instance principal service 208 may have to call to the compute instance service 202 each time the compute instance attempts to access the cloud resource. Because the signed metadata 212a-b is stored by the computing device 201, the instance principal service 208 may authenticate the compute instance and provide the instance principal certificates 214a-b without making a call to the compute instance service 202. The source of truth of the identity and IP address associated with the cloud services user and/or the compute instance has therefore been decentralized from the compute instance service to the computing device 201. In an environment such as that of a cloud services provider, where there are many computing devices, this may lead to greatly reduced traffic to the compute instance service 202.

Figure 3:
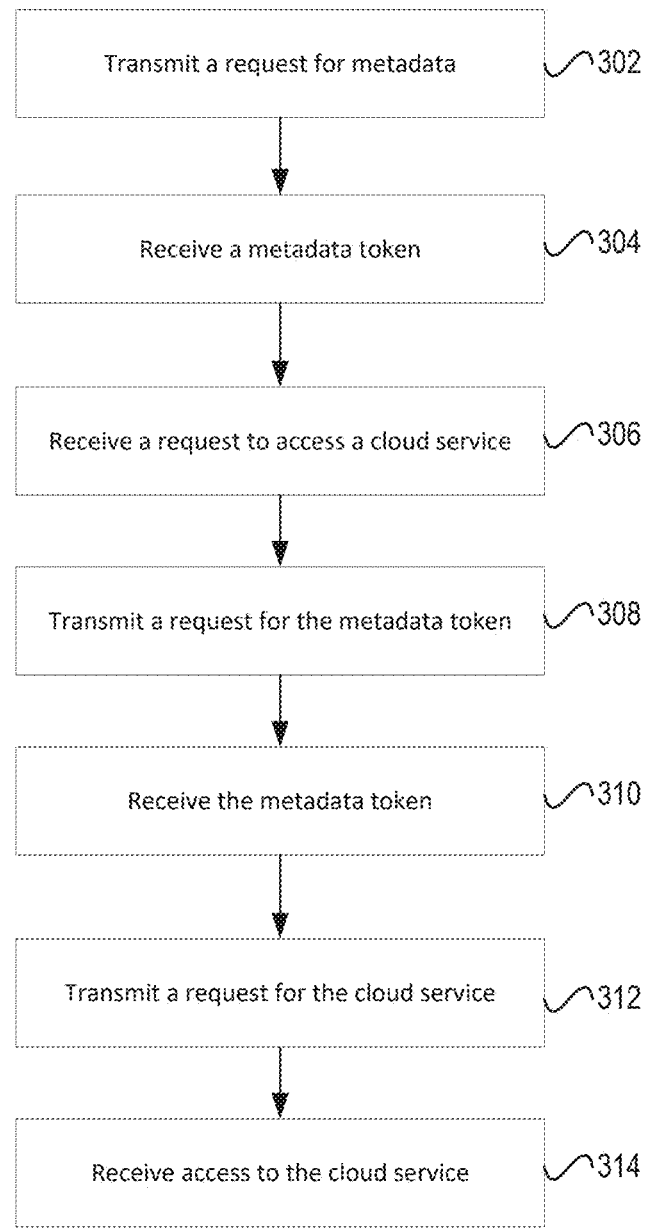
FIG. 3 illustrates a flowchart of a method, according to certain embodiments.

FIG. 3 illustrates a flowchart of a method 300, according to certain embodiments. While the operations of methods 300 are described as being performed by a computing system, it should be understood that any suitable device may be used to perform one or more operations of these processes. The methods 300 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At step 302, the method 300 may include transmitting, by a computing device, a request for metadata associated with a compute instance. The compute instance may be hosted on the computing device. The metadata may include information associated with the compute instance and/or a cloud services user such as a region, a subnet, identity credentials, a tenant identifier, an account identifier, an IP address associated with the computing device, and other such information. The request may be made in response to an instantiation of the compute instance. In some embodiments, the computing device may include a smart network interface card.

At step 304, the method 300 may include receiving, by a metadata service hosted by the computing device, metadata signed with a private key (signed metadata). The signed metadata may be associated with the compute instance. The private key may be associated with a public key. A token may be included in the signed metadata. The token may include a digital signature and/or an IP address associated with the computing device. The public key and the private key may be included in an asymmetrical key pair. In some embodiments, the asymmetrical key pair may be generated by a key management service. The key management service may be hosted by a cloud services provider or by a third-party.

In some embodiments, the asymmetrical key pair may be generated on a tenant-by-tenant basis and updated on a regular interval. For example, the signed metadata may have a scheduled expiry (e.g., 1 week). In some embodiments, the signed metadata may not expire, instead persisting until the compute instance is terminated. The asymmetrical key pair may then be updated at or before the scheduled expiry of the signed metadata. In some embodiments, the signed metadata may be refreshed prior to the scheduled expiry.

At step 306, the method 300 may include receiving, by the computing device, a request to access a cloud resource. The request may be made via the compute instance. The cloud resource may be an object storage, a cloud application, or other such cloud service.

At step 308, the method 300 may include transmitting, by an instance principal agent hosted on the computing device, a request for the signed metadata associated with the compute instance. The instance principal agent may transmit the request to the metadata service. The metadata service may be similar to the IMDS 104 in FIG. 1. The instance principal agent may be similar to the instance principal agent 106 in FIG. 1 and manage instance principal certificates for a plurality of compute instances hosted on the computing device. The instance principal certificates may be used to authenticate the associated compute instance in order to provide access to the cloud resource.

At step 310, the method 300 may include receiving, by the instance principal agent hosted on the computing device, the signed metadata. The signed metadata may indicate that the compute instance is hosted on the computing device. The signed metadata may be received from the metadata service.

At step 312, the method may include transmitting, by the instance principal agent, a request for an instance principal certificate. The request may be transmitted to an instance principal service such as the instance principal service 108 in FIG. 1. The instance principal service may be hosted by the cloud service provider. The request may include the signed metadata, including the digital signature and the IP address. The instance principal service may cryptographically verify the signed metadata using the public key of the public/private key pair. The instance principal service may also verify the IP address included in the signed metadata against the IP address associated with the request for the instance principal certificate.

At step 314, the method 300 may include receiving, by the computing device, the instance principal certificate. The instance principal certificate may include account information associated with the compute instance and/or the cloud services user, credentials for the cloud resource, and other such information. The instance principal certificate may have a scheduled expiry, shorter than that of the signed metadata (e.g., 2 hours). The computing device, via the instance principal agent, may store the instance principal certificate in the memory device up until the scheduled expiry. Upon reaching scheduled expiry of the instance principal certificate, the computing device (via the instance principal agent) may send a second request for an instance principal certificate to the instance principal service. After cryptographically verifying the digital signature included in the request and the IP address, the instance principal service may provide the computing device with the second instance principal certificate.

At step 316, the method 300 may include providing, by the computing device, access to the cloud resource based at least in part on the instance principal certificate. The cloud resource may be hosted by the cloud services provider or may be hosted by a third party.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
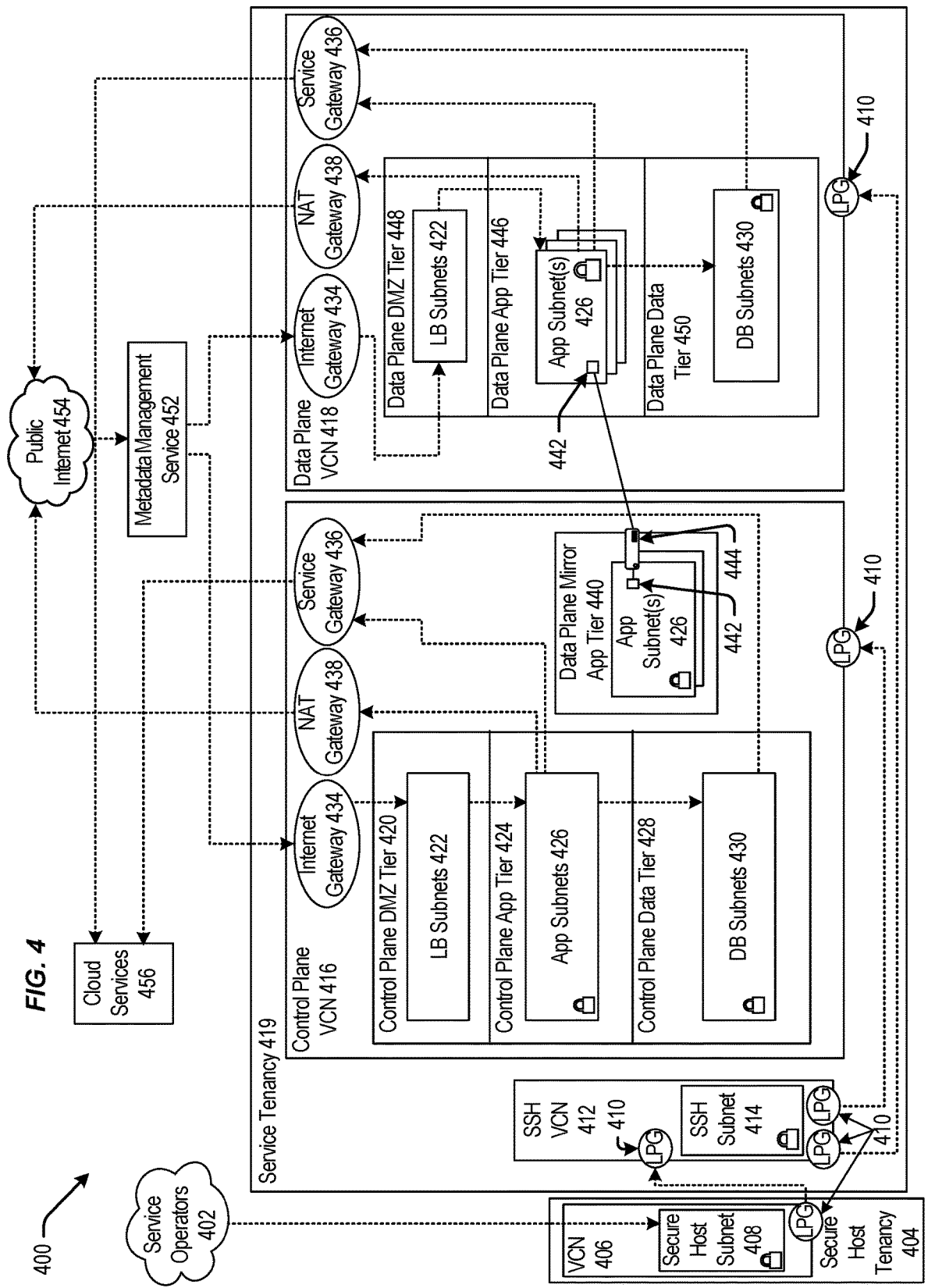
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Metadata that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
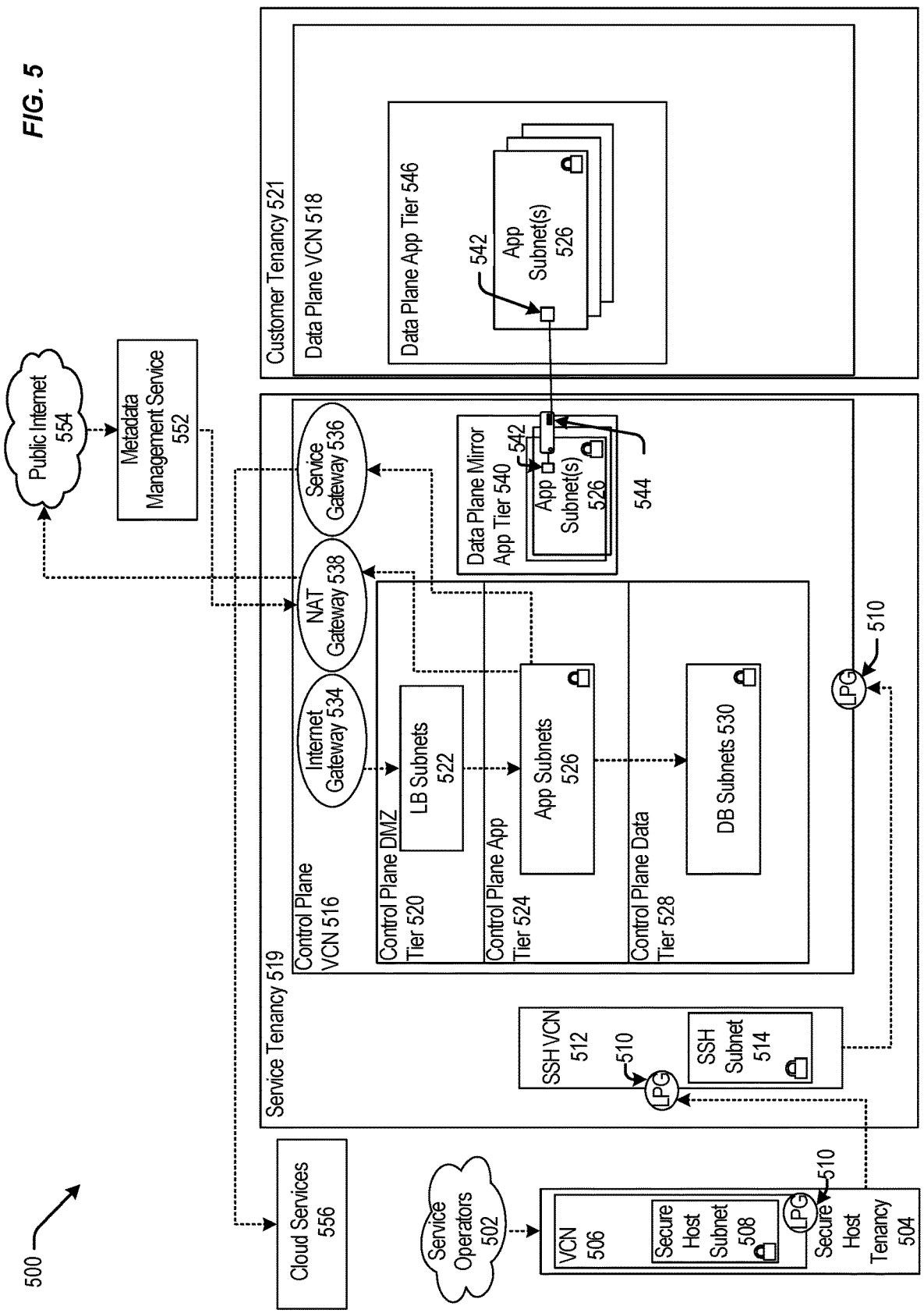
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g., service operators 402 of FIG. 4) can be communicatively coupled to a secure host tenancy 504 (e.g., the secure host tenancy 404 of FIG. 4) that can include a virtual cloud network (VCN) 506 (e.g., the VCN 406 of FIG. 4) and a secure host subnet 508 (e.g., the secure host subnet 408 of FIG. 4). The VCN 506 can include a local peering gateway (LPG) 510 (e.g., the LPG 410 of FIG. 4) that can be communicatively coupled to a secure shell (SSH) VCN 512 (e.g., the SSH VCN 412 of FIG. 4) via an LPG 410 contained in the SSH VCN 512. The SSH VCN 512 can include an SSH subnet 514 (e.g., the SSH subnet 414 of FIG. 4), and the SSH VCN 512 can be communicatively coupled to a control plane VCN 516 (e.g., the control plane VCN 416 of FIG. 4) via an LPG 510 contained in the control plane VCN 516. The control plane VCN 516 can be contained in a service tenancy 519 (e.g., the service tenancy 419 of FIG. 4), and the data plane VCN 518 (e.g., the data plane VCN 418 of FIG. 4) can be contained in a customer tenancy 521 that may be owned or operated by users, or customers, of the system.

The control plane VCN 516 can include a control plane DMZ tier 520 (e.g., the control plane DMZ tier 420 of FIG. 4) that can include LB subnet(s) 522 (e.g., LB subnet(s) 422 of FIG. 4), a control plane app tier 524 (e.g., the control plane app tier 424 of FIG. 4) that can include app subnet(s) 526 (e.g., app subnet(s) 426 of FIG. 4), a control plane data tier 528 (e.g., the control plane data tier 428 of FIG. 4) that can include database (DB) subnet(s) 530 (e.g., similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g., the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g., the service gateway 436 of FIG. 4) and a network address translation (NAT) gateway 538 (e.g., the NAT gateway 438 of FIG. 4). The control plane VCN 516 can include the service gateway 536 and the NAT gateway 538.

The control plane VCN 516 can include a data plane mirror app tier 540 (e.g., the data plane mirror app tier 440 of FIG. 4) that can include app subnet(s) 526. The app subnet(s) 526 contained in the data plane mirror app tier 540 can include a virtual network interface controller (VNIC) 542 (e.g., the VNIC of 442) that can execute a compute instance 544 (e.g., similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g., the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g., the metadata management service 452 of FIG. 4) that can be communicatively coupled to public Internet 554 (e.g., public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g., cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
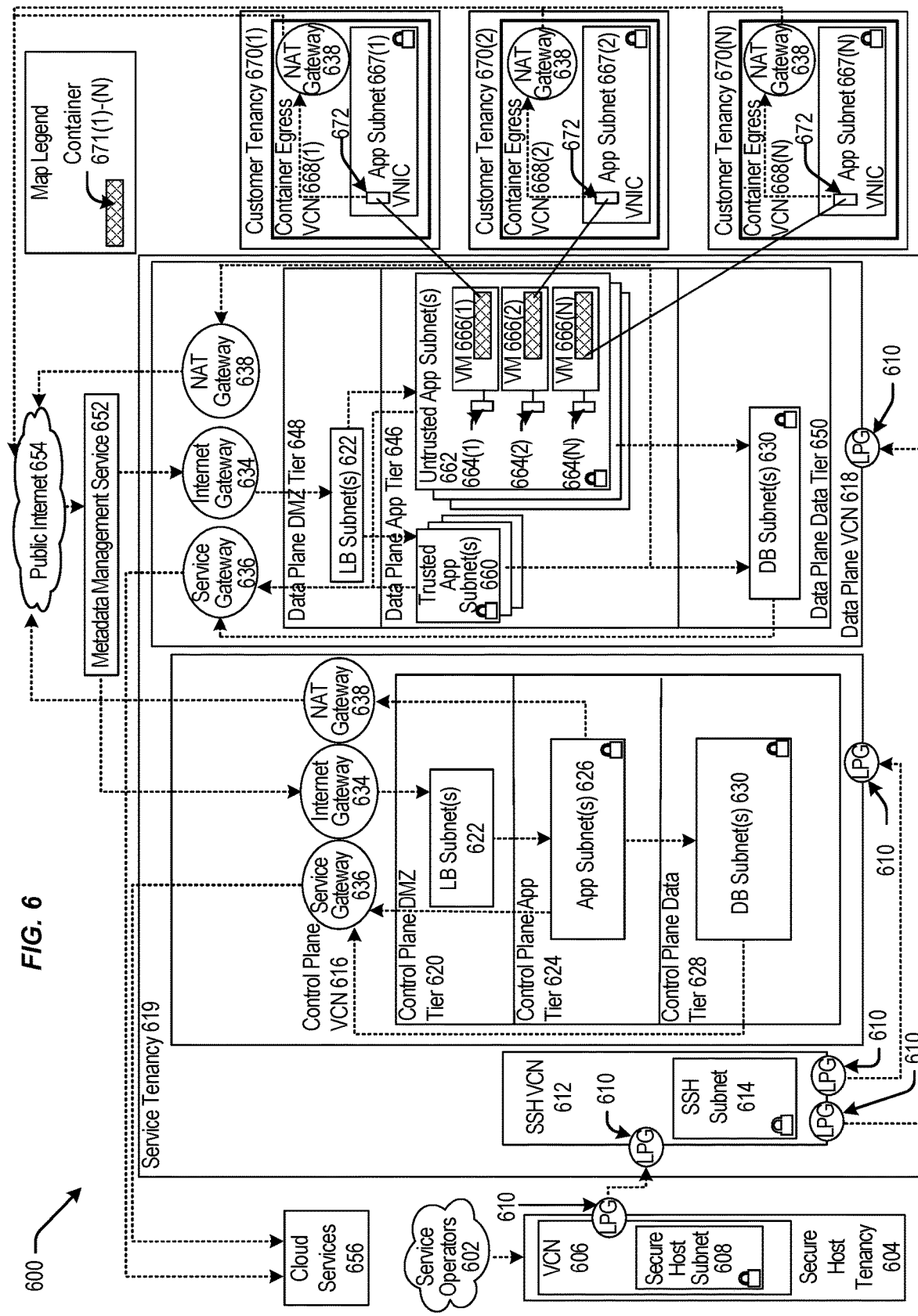
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 402 of FIG. 4) can be communicatively coupled to a secure host tenancy 604 (e.g., the secure host tenancy 404 of FIG. 4) that can include a virtual cloud network (VCN) 606 (e.g., the VCN 406 of FIG. 4) and a secure host subnet 608 (e.g., the secure host subnet 408 of FIG. 4). The VCN 606 can include an LPG 610 (e.g., the LPG 410 of FIG. 4) that can be communicatively coupled to an SSH VCN 612 (e.g., the SSH VCN 412 of FIG. 4) via an LPG 610 contained in the SSH VCN 612. The SSH VCN 612 can include an SSH subnet 614 (e.g., the SSH subnet 414 of FIG. 4), and the SSH VCN 612 can be communicatively coupled to a control plane VCN 616 (e.g., the control plane VCN 416 of FIG. 4) via an LPG 610 contained in the control plane VCN 616 and to a data plane VCN 618 (e.g., the data plane 418 of FIG. 4) via an LPG 610 contained in the data plane VCN 618. The control plane VCN 616 and the data plane VCN 618 can be contained in a service tenancy 619 (e.g., the service tenancy 419 of FIG. 4).

The control plane VCN 616 can include a control plane DMZ tier 620 (e.g., the control plane DMZ tier 420 of FIG. 4) that can include load balancer (LB) subnet(s) 622 (e.g., LB subnet(s) 422 of FIG. 4), a control plane app tier 624 (e.g., the control plane app tier 424 of FIG. 4) that can include app subnet(s) 626 (e.g., similar to app subnet(s) 426 of FIG. 4), a control plane data tier 628 (e.g., the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g., the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g., the service gateway of FIG. 4) and a network address translation (NAT) gateway 638 (e.g., the NAT gateway 438 of FIG. 4). The control plane VCN 616 can include the service gateway 636 and the NAT gateway 638.

The data plane VCN 618 can include a data plane app tier 646 (e.g., the data plane app tier 446 of FIG. 4), a data plane DMZ tier 648 (e.g., the data plane DMZ tier 448 of FIG. 4), and a data plane data tier 650 (e.g., the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g., public Internet 454 of FIG. 4).

The Internet gateway 634 contained in the control plane VCN 616 and contained in the data plane VCN 618 can be communicatively coupled to a metadata management service 652 (e.g., the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
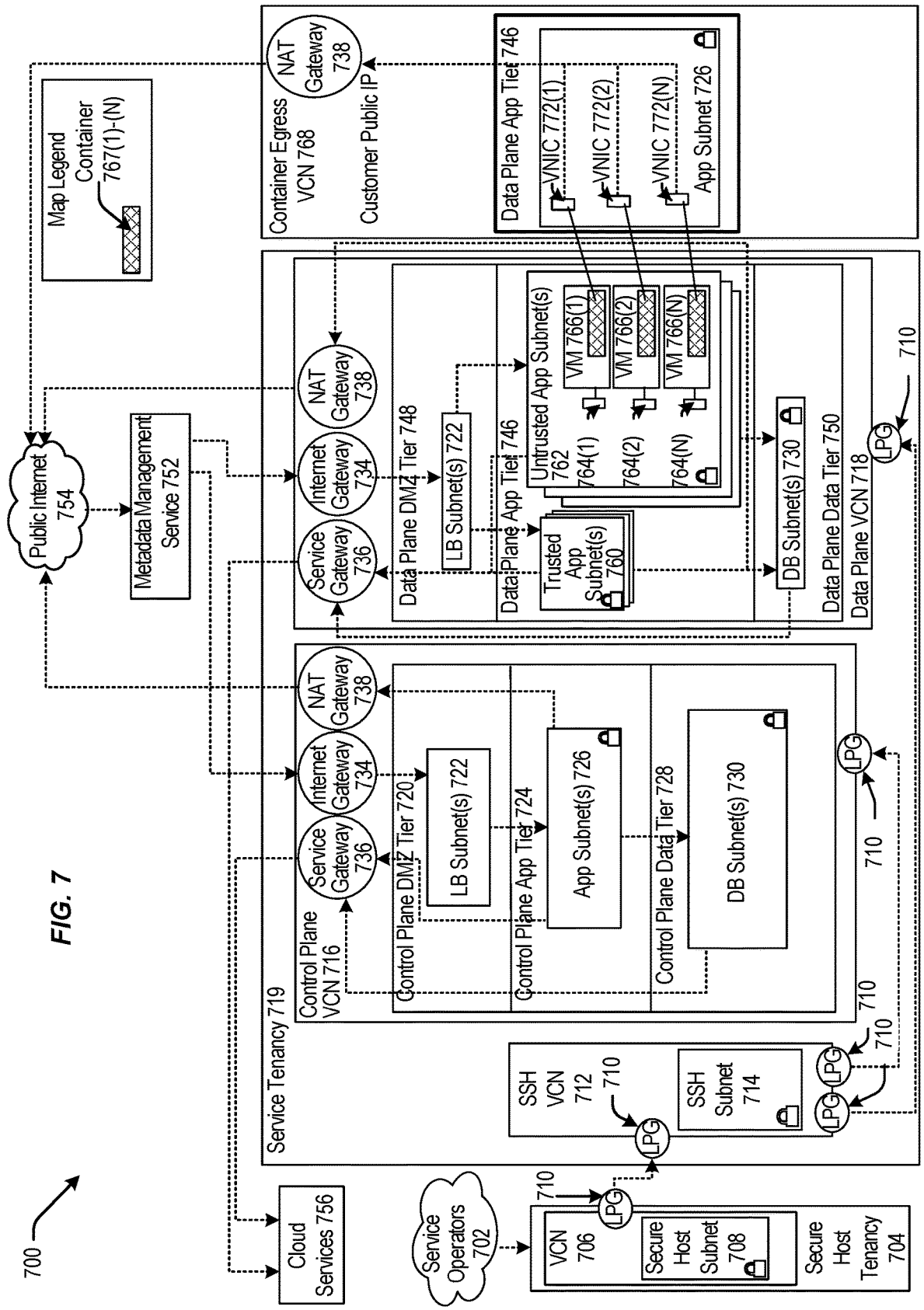
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 402 of FIG. 4) can be communicatively coupled to a secure host tenancy 704 (e.g., the secure host tenancy 404 of FIG. 4) that can include a virtual cloud network (VCN) 706 (e.g., the VCN 406 of FIG. 4) and a secure host subnet 708 (e.g., the secure host subnet 408 of FIG. 4). The VCN 706 can include an LPG 710 (e.g., the LPG 410 of FIG. 4) that can be communicatively coupled to an SSH VCN 712 (e.g., the SSH VCN 412 of FIG. 4) via an LPG 710 contained in the SSH VCN 712. The SSH VCN 712 can include an SSH subnet 714 (e.g., the SSH subnet 414 of FIG. 4), and the SSH VCN 712 can be communicatively coupled to a control plane VCN 716 (e.g., the control plane VCN 416 of FIG. 4) via an LPG 710 contained in the control plane VCN 716 and to a data plane VCN 718 (e.g., the data plane 418 of FIG. 4) via an LPG 710 contained in the data plane VCN 718. The control plane VCN 716 and the data plane VCN 718 can be contained in a service tenancy 719 (e.g., the service tenancy 419 of FIG. 4).

The control plane VCN 716 can include a control plane DMZ tier 720 (e.g., the control plane DMZ tier 420 of FIG. 4) that can include LB subnet(s) 722 (e.g., LB subnet(s) 422 of FIG. 4), a control plane app tier 724 (e.g., the control plane app tier 424 of FIG. 4) that can include app subnet(s) 726 (e.g., app subnet(s) 426 of FIG. 4), a control plane data tier 728 (e.g., the control plane data tier 428 of FIG. 4) that can include DB subnet(s) 730 (e.g., DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g., the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 4) and a network address translation (NAT) gateway 738 (e.g., the NAT gateway 438 of FIG. 4). The control plane VCN 716 can include the service gateway 736 and the NAT gateway 738.

The data plane VCN 718 can include a data plane app tier 746 (e.g., the data plane app tier 446 of FIG. 4), a data plane DMZ tier 748 (e.g., the data plane DMZ tier 448 of FIG. 4), and a data plane data tier 750 (e.g., the data plane data tier 450 of FIG. 4). The data plane DMZ tier 748 can include LB subnet(s) 722 that can be communicatively coupled to trusted app subnet(s) 760 (e.g., trusted app subnet(s) 660 of FIG. 6) and untrusted app subnet(s) 762 (e.g., untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g., public Internet 454 of FIG. 4).

The Internet gateway 734 contained in the control plane VCN 716 and contained in the data plane VCN 718 can be communicatively coupled to a metadata management service 752 (e.g., the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
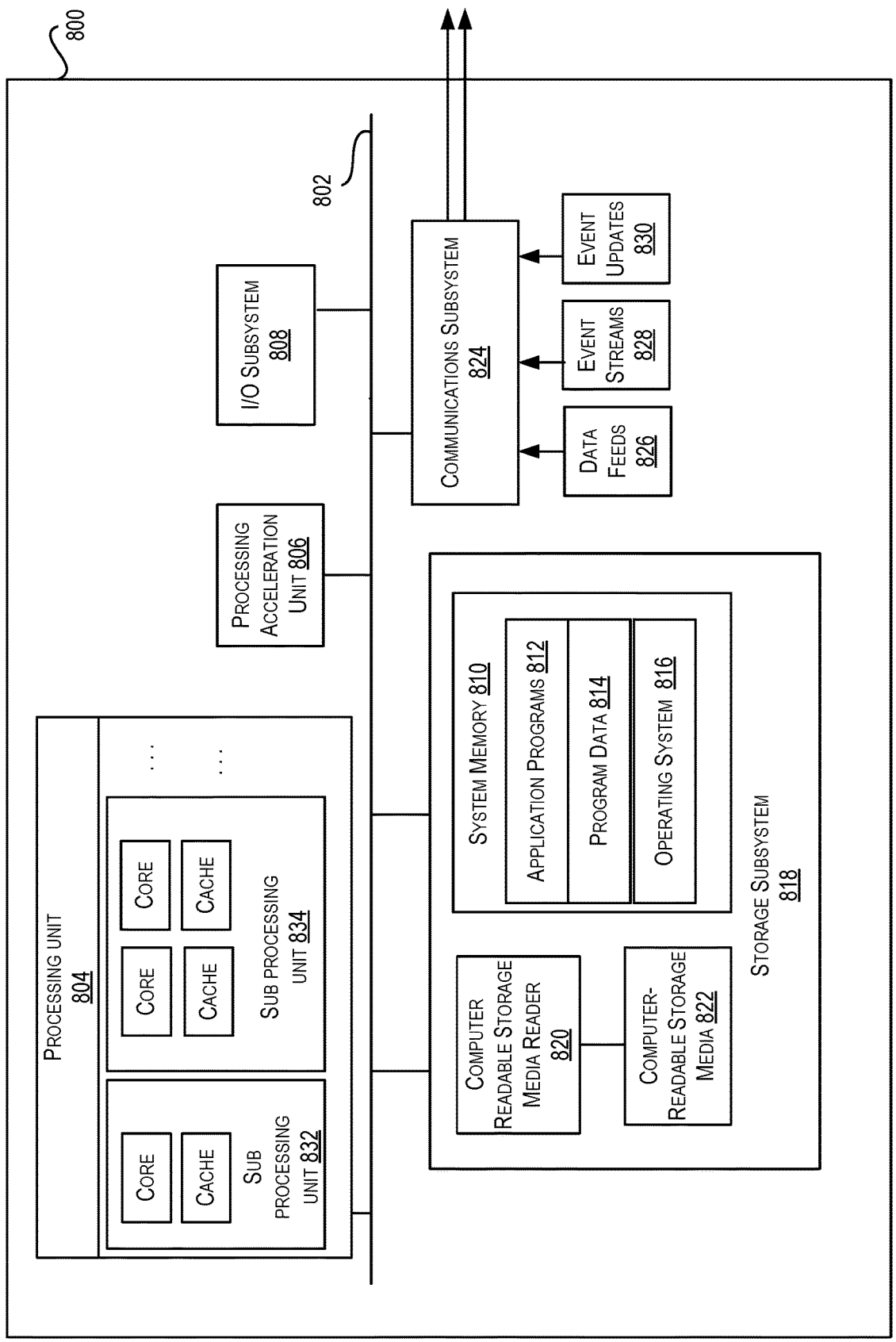
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 804 provide the functionality described above. Storage subsystem 818 may also provide a repository for storing data used in accordance with the present disclosure.

As depicted in the example in FIG. 8, storage subsystem 818 can include various components including a system memory 810, computer-readable storage media 822, and a computer readable storage media reader 820. System memory 810 may store program instructions that are loadable and executable by processing unit 804. System memory 810 may also store data that is used during the execution of the instructions and/or data that is generated during the execution of the program instructions. Various different kinds of programs may be loaded into system memory 810 including but not limited to client applications, Web browsers, mid-tier applications, relational database management systems (RDBMS), virtual machines, containers, etc.

System memory 810 may also store an operating system 816. Examples of operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 800 executes one or more virtual machines, the virtual machines along with their guest operating systems (GOSs) may be loaded into system memory 810 and executed by one or more processors or cores of processing unit 804.

System memory 810 can come in different configurations depending upon the type of computer system 800. For example, system memory 810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 810 may include a basic input/output system (BIOS) containing basic routines that help to transfer information between elements within computer system 800, such as during start-up.

Computer-readable storage media 822 may represent remote, local, fixed, and/or removable storage devices plus storage media for temporarily and/or more permanently containing, storing, computer-readable information for use by computer system 800 including instructions executable by processing unit 804 of computer system 800.

Computer-readable storage media 822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Machine-readable instructions executable by one or more processors or cores of processing unit 804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
transmitting, by a computing system, a request for metadata associated with a compute instance to be hosted on the computing system;
receiving, by a metadata service hosted by the computing system, metadata signed with a private key and associated with the compute instance, the private key associated with a public key;
receiving, by the computing system via the compute instance, a request to access a cloud resource;
transmitting, by an instance principal agent hosted on the computing system and to the metadata service, a request for the metadata associated with the compute instance;
receiving, by the instance principal agent hosted on the computing system, the metadata signed with the private key, the metadata signed with the private key indicating that the compute instance is hosted on the computing system;
transmitting, by the instance principal agent and to an instance principal service, a request for an instance principal certificate, the request comprising the metadata signed with the private key and being cryptographically verified by the instance principal service using the public key;
receiving, by the computing system, the instance principal certificate; and
providing, by the computing system, access to the cloud resource based at least in part on the instance principal certificate.

2. The method of claim 1, wherein the private key and the public key comprise an asymmetrical key pair.

3. The method of claim 2, wherein the asymmetrical key pair is generated by a key management service hosted by a cloud provider.

4. The method of claim 2, wherein the asymmetrical key pair is generated on a tenant-by-tenant basis, and wherein the asymmetrical key pair is updated on a regular interval.

5. The method of claim 1, wherein the metadata includes information comprising at least one of an account identifier, a tenant identifier, or an Internet Protocol (IP) address associated with the computing device.

6. The method of claim 5, wherein the instance principal service verifies a particular IP address used to transmit the request for the cloud service against the IP address associated with the computing device.

7. The method of claim 1, wherein the computing device comprises a smart network interface card.

8. The method of claim 1, wherein the signed metadata is refreshed prior to a scheduled expiration.

9. A system, comprising:
one or more processors; and
one or more computer-readable media comprising instructions that, when executed by the one or more processors, cause the system to perform operations to:
transmit, by the system, a request for metadata associated with a compute instance to be hosted on the system;
receive, by a metadata service hosted by the system, metadata signed with a private key and associated with the compute instance, the private key associated with a public key;
receive, by the system via the compute instance, a request to access a cloud resource;
transmit, by an instance principal agent hosted on the system and to the metadata service, a request for the metadata associated with the compute instance;
receive, by the instance principal agent hosted on the system, the metadata signed with the private key, the metadata signed with the private key indicating that the compute instance is hosted on the system;
transmit, by the instance principal agent and to an instance principal service, a request for an instance principal certificate, the request comprising the metadata signed with the private key and being cryptographically verified by the instance principal service using the public key;
receive by the system, the instance principal certificate; and
provide, by the system, access to the cloud resource based at least in part on the instance principal certificate.

10. The system of claim 9, wherein the private key and the public key comprise an asymmetrical key pair.

11. The system of claim 9, wherein the asymmetrical key pair is generated by a key management service hosted by a cloud provider.

12. The system of claim 11, wherein the asymmetrical key pair is generated on a tenant-by-tenant basis, and wherein the asymmetrical key pair is updated on a regular interval.

13. The system of claim 9, wherein the metadata includes information comprising at least one of an account identifier, a tenant identifier, or an Internet Protocol (IP) address associated with the computing device.

14. The system of claim 13, wherein the instance principal service verifies a particular IP address used to transmit the request for the cloud service against the IP address associated with the computing device.

15. The system of claim 9, wherein the computing device comprises a smart network interface card.

16. The system of claim 9, wherein the signed metadata is refreshed prior to a scheduled expiration.

17. A non-transitory computer-readable storage medium storing a set of instructions that, when executed by one or more processors of a computer system, cause the computer system to perform operations comprising:
transmitting, by the computer system, a request for metadata associated with a compute instance to be hosted on the computer system;
receiving, by a metadata service hosted by the computer system, metadata signed with a private key and associated with the compute instance, the private key associated with a public key;
receiving, by the computer system via the compute instance, a request to access a cloud resource;
transmitting, by an instance principal agent hosted on the computer system and to the metadata service, a request for the metadata associated with the compute instance;
receiving, by the instance principal agent hosted on the computer system, the metadata signed with the private key, the metadata signed with the private key indicating that the compute instance is hosted on the computer system;
transmitting, by the instance principal agent and to an instance principal service, a request for an instance principal certificate, the request comprising the metadata signed with the private key and being cryptographically verified by the instance principal service using the public key;
receiving, by the computer system, the instance principal certificate; and providing, by the computer system, access to the cloud resource based at least in part on the instance principal certificate.

18. The non-transitory computer-readable storage medium of claim 17, wherein the private key and the public key comprise an asymmetrical key pair.

19. The non-transitory computer-readable storage medium of claim 18, wherein the asymmetrical key pair is generated by a key management service hosted by a cloud provider.

20. The non-transitory computer-readable storage medium of claim 18, wherein the asymmetrical key pair is generated on a tenant-by-tenant basis, and wherein the asymmetrical key pair is updated on a regular interval.

\* \* \* \* \*